United States Patent [19]

Cataldo

[11] 4,181,031
[45] Jan. 1, 1980

[54] CHAIN FOR A V-DRIVE ARRANGEMENT

[75] Inventor: Roy S. Cataldo, Birmingham, Mich.

[73] Assignee: General Motors Corporation, Detroit, Mich.

[21] Appl. No.: 903,714

[22] Filed: May 8, 1978

[51] Int. Cl.$^2$ ............................................. F16G 5/18
[52] U.S. Cl. ...................................... 74/234; 74/236
[58] Field of Search ................ 74/234, 230.17 S, 233, 74/236, 245 S, 250 S, 251 S; 198/851

[56] References Cited

U.S. PATENT DOCUMENTS

| | | | |
|---|---|---|---|
| 1,312,580 | 8/1919 | Saris | 74/236 |
| 2,550,431 | 4/1951 | Shaw | 74/230.17 S |
| 2,913,916 | 11/1959 | Schmidt | 74/236 |
| 3,016,755 | 1/1962 | Dittrich | 74/230.17 S |
| 3,049,933 | 8/1962 | Besel | 74/230.17 S |

FOREIGN PATENT DOCUMENTS 314293  6/1929  United Kingdom ...................... 74/236

*Primary Examiner*—C. J. Husar
*Assistant Examiner*—Conrad Berman
*Attorney, Agent, or Firm*—Donald F. Scherer

[57] ABSTRACT

The drawings illustrate an endless power transmitting chain for use with V-pulleys. The chain includes a plurality of right and left-hand sets of L-shaped members rigidly connected together in a stacked relationship such that the vertically extending legs thereof define uniform spaces therebetween. Connector links are mounted in the spaces and the two sets of drive elements and connector links are secured together by a pair of conventional rocker link half pins. Tapered end faces are formed on the ends of the laterally extending legs for respective frictional engagement with oppositely disposed conical faces of the V-pulley. In an alternate arrangement, the drive links are formed from a solid piece rather than from stacked L-shaped drive elements.

4 Claims, 6 Drawing Figures

4,181,031

CHAIN FOR A V-DRIVE ARRANGEMENT

The invention relates generally to the V-pulley type drive arrangement and, more particularly, to a power transmitting chain for such an arrangement.

Heretofore, chain and V-pulley drive arrangements have generally included chains wherein the only contact between the chain links and respective oppositely disposed conical faces of cooperating V-pulleys is the relatively small surface areas at the opposite extended ends of the rocker link pins, as shown, for example in Besel U.S. Pat. No. 3,049,933, Shaw U.S. Pat. No. 2,500,431 and Dittrich U.S. Pat. No. 3,016,755. While such arrangements have performed generally satisfactorily, it is desirable for some V-drive applications to provide a greater contact area between the links and the pulleys for substantially higher load capacity without slippage, as compared to these arrangements.

Accordingly, a general objective of the invention is to provide an improved chain for a V-pulley transmission arrangement, wherein maximum frictional contact area is provided between the chain links and the conical surfaces of the V-pulley.

Another object of the invention is to provide a power transmitting chain for use with V-pulleys wherein the frictional contact between the links and the conical surfaces of the pulley is by way of tapered ends formed on the link proper, rather than on only the extended ends of rocker type pin members.

A further object of the invention is to provide a power transmitting chain for use with V-pulleys, including chain links consisting of a plurality of right and left-hand sets of L-shaped members rigidly connected together in a stacked relationship such that the respective vertically extending legs thereof define uniform spaces therebetween. Connector links are mounted in the spaces for interconnecting adjacent chain links, and the two sets of drive elements and connector links are secured together by a pair of conventional rocker link half pins. Tapered end faces are formed on the ends of the laterally extending legs for respective frictional engagement with oppositely disposed conical faces of the V-pulley.

Still another object of the invention is to provide an alternate chain arrangement for use with a V-pulley, wherein the drive links are formed as a solid piece rather than a plurality of L-shaped stacked drive elements, with tapered ends formed on the lateral extensions of the solid pieces for engagement with the V-pulley.

These and other objects and advantages will become more apparent when reference is made to the following description and accompanying drawings, wherein.

Figure 1:
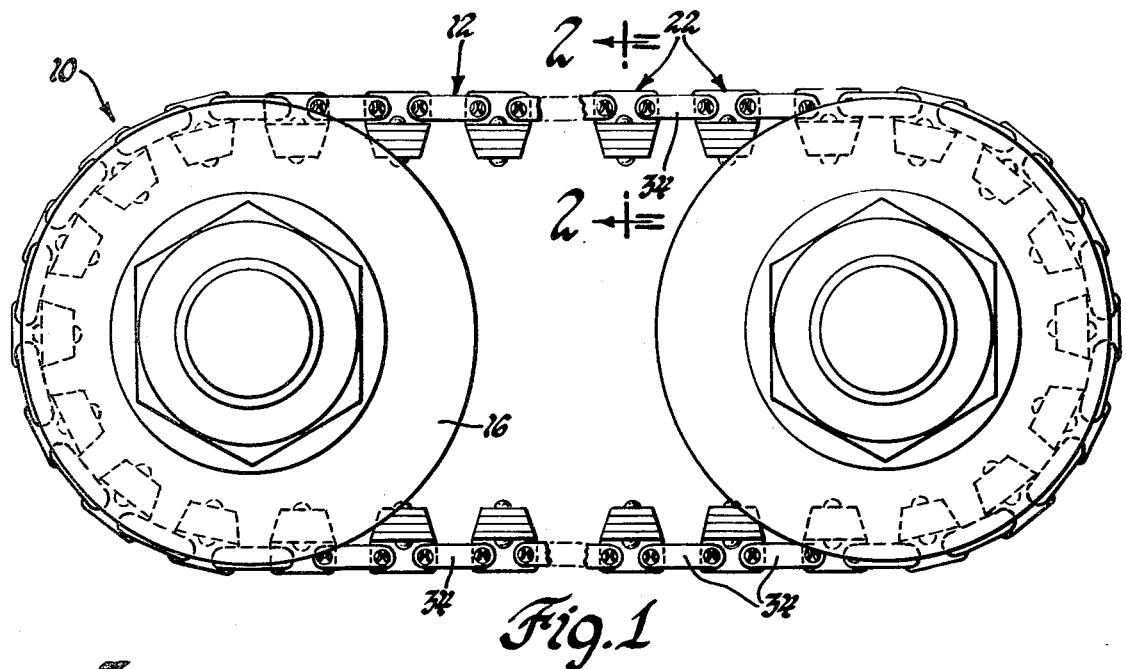
FIG. 1 is a side elevational view of a pulley and chain arrangement embodying the invention.
Figure 2:
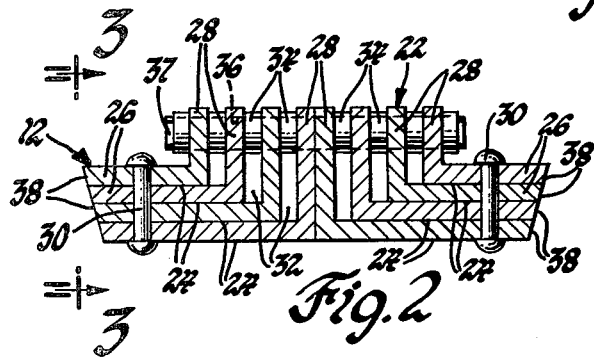
FIG. 2 is an enlarged cross-sectional view taken along the plane of the line 2—2 of FIG. 1, and looking in the direction of the arrows.
Figure 3:
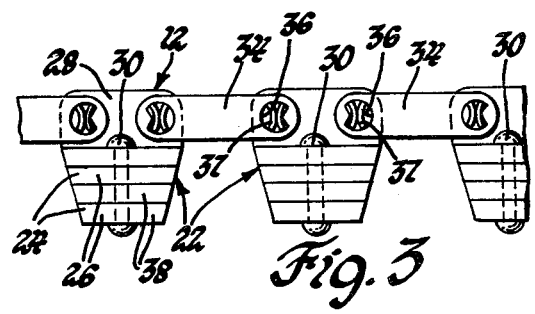
FIG. 3 is a fragmentary end view taken along the plane of the line 3—3 of FIG. 2, and looking in the direction of the arrows.
Figure 4:
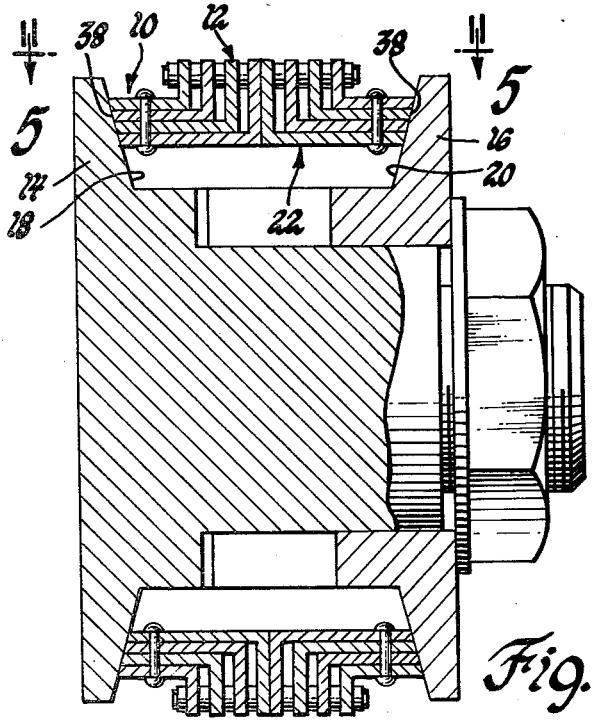
FIG. 4 is an enlarged cross-sectional view of a portion of the FIG. 1 structure.

Referring now to the drawings in greater detail, FIGS. 1 and 4 illustrate a V-belt pulley arrangment 10 including an elongated power transmitting, endless link chain 12 mounted around a pair of discs 14 and 16 having respective opposite, coaxial, adjustable conical faces 18 and 20 constituting V-pulleys. The chain 12 includes plurality of links 22, each of which includes right and left-hand sets of L-shaped drive members 24, each drive member having a laterally extending leg 26 and a vertically extending leg 28. Fastener means, such as rivets 30, rigidly connect the laterally extending legs 26 of each set of drive elements 24 in an abutting stacked relationship such that the vertical extending legs 28 thereof are positioned predetermined distances apart so as to define uniform spaces 32 therebetween. Two connector links 34 are mounted so as to have adjacent ends positioned in each space 32 between adjacent vertically extending legs in an interleaved relationship therewith. A pair of longitudinally spaced transverse bores 36 (FIG. 3) are formed through the respective interleaved connector links 34 and the vertically extending legs 28 of the two oppositely disposed sets of drive elements 24, as shown in FIG. 2. A pair of rocker link half pins 37 (FIG. 3) are extended through each of the transverse bores 36. The bores and associated pins may be of any conventional type, such as shown and described in Besel U.S. Pat. No. 3,049,933.

Figure 5:
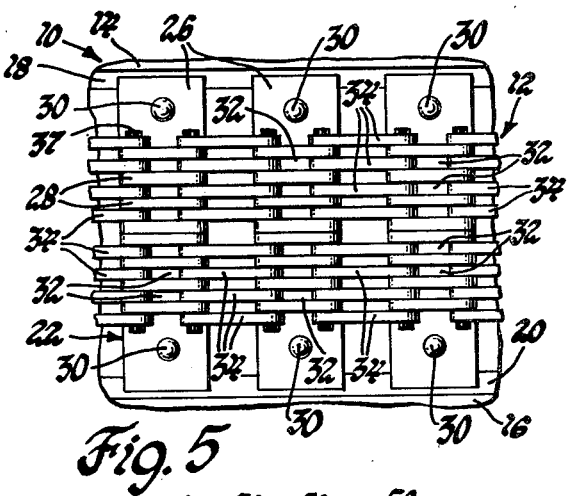
FIG. 5 is a top view taken along the plane of the line 5—5 of FIG. 4, and looking in the direction of the arrows.

Two additional connector links 34 are connected at adjacent ends thereof to the respective extended ends of each pair of half rocker link half pins 37, on each side of the right and left-hand sets of drive elements 24 for interconnecting circumferentially adjacent right and left-hand sets of drive elements 24 (FIGS. 1, 3 and 5).

End faces 38 are formed on the ends of the respective stacked sets of laterally extending legs 26, so as to form a continuous tapered surface, each set tapering in a direction which is radially inward with respect to the pulley axis, the tapered end faces being oppositely disposed with respect to the opposite hand set of laterally extending legs 24 for respective frictional engagement with the oppositely disposed conical faces 18 and 20 of the V-pulley discs 14 and 16.

Figure 6:
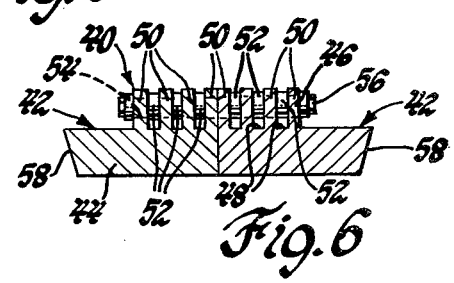
FIG. 6 is a view similar to FIG. 2 showing an alternate embodiment of the invention.

The alternate embodiment of FIG. 6 illustrates chain links 40 which include oppositely disposed L-shaped solid drive members 42, each having a laterally extending leg 44 and a vertical leg 46, with a plurality of equally spaced vertical slots 48 formed in each vertically extending leg of each drive member, providing the plurality of vertical leg segments 50. A connector link 52 is positioned in each slot 48 as in the spaces 32 described above relative to FIG. 2. A pair of longitudinally spaced transverse bores 54 are formed through the connector links 52 and the vertical leg segments 50 of the two oppositely disposed drive members 42, adapted to receive respective pairs of rocker link half pins 56, comparable to those shown in the FIGS. 2 and 3 arrangement. End faces 58 are formed on the ends of the laterally extending legs 44 of the oppositely disposed drive members 42, tapering in the same manner as the individual leg end faces 38 of FIG. 2 structure, for respective frictional engagement with the oppositely disposed conical faces 18 and 20 of the V-pulley discs 14 and 16.

It is apparent that as the discs of continuously variable V-pulleys are moved toward or away from each other, to form wider or narrower V-grooves, tapered end faces of the respective links will slide respectively radially outwardly and inwardly along the conical faces 18 and 20, depending upon the drive ratio desired. It is also apparent that the pulleys need not be the continuously variable type, but, rather may have fixed width grooves formed therein.

While but two embodiments of the invention have been shown and described, other modifications thereof are possible.

The embodiments of the invention in which an exclusive property or privilege is claimed are defined as follows:

1. An elongated power transmitting chain for use with a pair of discs having respective opposite coaxial conical faces constituting a V-pulley, said chain comprising a plurality of right and left-hand sets of L-shaped drive elements, fastener means for rigidly connecting the laterally extending legs of each set of drive elements in an abutting stacked relationshipand such that the vertically extending legs thereof are positioned predetermined distances apart so as to form uniform spaces therebetween, a connector link positioned in each space between adjacent vertically extending legs in an interleaved relationship therewith, two transverse bores formed through the interleaved connector links and vertically extending legs of the two oppositely disposed sets of drive elements, pin means extended through each of said transverse bores, two additional connector links connected at adjacent ends thereof to the respective extended ends of each pair of half pins on each side of said right and left-hand sets of drive elements, said intermediate and additional connector links interconnecting circumferentially adjacent right and left-hand sets of drive elements, and end faces formed on the ends of the laterally extending legs of each set of drive elements and tapering so as to frictionally engage said opposite conical faces.

2. An elongated power transmitting chain for use with a pair of discs having respective opposite coaxial conical faces constituting a V-pulley, said chain comprising a plurality of oppositely disposed L-shaped drive members, a plurality of equally spaced vertical slots formed in the vertically extending leg of each drive member providing vertical leg segments, a connector link positioned in each slot, two axially aligned transverse bores formed through the connector links and vertical leg segments of the two oppositely disposed drive members, pin means extended through each of said transverse bores, two additional connector links connected at adjacent ends thereof to the respective extended ends of each pair of half pins on each side of said oppositely disposed drive members, said intermediate and additional connector links interconnecting circumferentially adjacent oppositely disposed drive members, and end faces formed on the ends of the laterally extending legs of said oppositely disposed drive members and tapering so as to frictionally engage opposite conical faces.

3. An elongated power transmitting chain for use with a pair of discs having respective opposite coaxial conical faces constituting a V-pulley, said chain comprising a plurality of links, each link having right and left-hand sets of L-shaped drive elements, fastener means for rigidly connecting the laterally extending legs of each set of drive elements in an abutting stacked relationship and such that the vertically extending legs thereof are positioned predetermined distances apart so as to form uniform spaces therebetween, a connector link positioned in each space between adjacent vertically extending legs in an interleaved relationship therewith, two spaced transverse bores formed through the interleaved connector links and vertically extending legs of the two oppositely disposed sets of drive elements, a pair of rocker link half pins extended through each of said transverse bores, two additional connector links connected at adjacent ends thereof to the respective extended ends of each pair of half pins on each side of said right and left-hand sets of drive elements for interconnecting circumferentially adjacent right and left-hand sets of drive elements, and end faces formed on the ends of the laterally extending legs of each set of drive elements and tapering in a direction which is radially inward with respect to the pulley axis and being oppositely disposed with respect to the opposite hand set for respective frictional engagement with said opposite conical faces.

4. An elongated power transmitting chain for use with a pair of discs having respective opposite coaxial conical faces constituting a V-pulley, said chain comprising a plurality of links, each link having oppositely disposed L-shaped drive members, a plurality of equally spaced vertical slots formed in the vertically extending leg of each drive member providing vertical leg segments, a connector link positioned in each slot, two longitudinally spaced transverse bores formed through the connector links and vertical leg segments of the two oppositely disposed drive members, a pair of rocker link half pins extended through each of said transverse bores, two additional connector links connected at adjacent ends thereof to the respective extended ends of each pair of half pins on each side of said oppositely disposed drive members for interconnecting circumferentially adjacent oppositely disposed drive members, and end faces formed on the ends of the laterally extending legs of said oppositely disposed drive members and tapering in a direction which is radially inward with respect to the pulley axis and being oppositely disposed with respect to the other drive member for respective frictional engagement with said opposite conical faces.

* * * * *